US011875762B2

United States Patent
(12) United States Patent
Shigeno

(10) Patent No.: US 11,875,762 B2
(45) Date of Patent: Jan. 16, 2024

(54) EFFECT IMPARTING DEVICE, CONTROL METHOD AND NON-TRANSITORY COMPUTER READABLE MEDIUM

(71) Applicant: Roland Corporation, Shizuoka (JP)

(72) Inventor: Yukio Shigeno, Shizuoka (JP)

(73) Assignee: Roland Corporation, Shizuoka (JP)

( * ) Notice: Subject to any disclaimer, the term of this patent is extended or adjusted under 35 U.S.C. 154(b) by 709 days.

(21) Appl. No.: 17/042,907

(22) PCT Filed: Mar. 30, 2018

(86) PCT No.: PCT/JP2018/013908

§ 371 (c)(1),
(2) Date: Sep. 28, 2020

(87) PCT Pub. No.: WO2019/187119

PCT Pub. Date: Oct. 3, 2019

(65) Prior Publication Data

US 2021/0056940 A1 Feb. 25, 2021

(51) Int. Cl.
*G10H 1/00* (2006.01)
*G10H 1/18* (2006.01)
*G10H 1/46* (2006.01)

(52) U.S. Cl.
CPC ............. *G10H 1/0008* (2013.01); *G10H 1/18* (2013.01); *G10H 1/46* (2013.01)

(58) Field of Classification Search
CPC ...... G10H 1/0008; G10H 1/0091; G10H 1/18; G10H 1/46; G10H 1/181; G10H 1/02;
(Continued)

(56) References Cited

U.S. PATENT DOCUMENTS 5,570,424 A 10/1996 Araya et al.
2015/0125001 A1* 5/2015 Shimizu ................ H03G 3/348 381/104

FOREIGN PATENT DOCUMENTS

JP H0683343 3/1994
JP H06289871 10/1994
(Continued)

OTHER PUBLICATIONS

"Search Report of Europe Counterpart Application", dated Oct. 8, 2021, pp. 1-8.

(Continued)

*Primary Examiner* — Yogeshkumar Patel
(74) *Attorney, Agent, or Firm* — JCIPRNET

(57) ABSTRACT

An effect imparting device, control method and non-transitory computer readable medium are provided. This effect imparting device has: a plurality of effect units that provide effects to a sound that has been input; a storage part for storing a plurality of patches each including a collection of parameters to be applied to the effect units; an input part for receives a designation of a patch; an application part for applying the parameters included in the designated patch to the effect units; an output part for outputting the sound to which effects have been provided in accordance with the parameters applied to the effect units; and a muting means for temporarily muting the effects—provided sound to be outputted when the effects units include an effect unit in which the type of an effect is changed through changing of the designated patch.

15 Claims, 11 Drawing Sheets

(58) Field of Classification Search
CPC ....... G10H 2210/251; G10H 2210/281; G10H 2210/155
See application file for complete search history.

(56) References Cited

FOREIGN PATENT DOCUMENTS

| | | | | |
|---|---|---|---|---|
| JP | H0830271 | | | 2/1996 |
| JP | H0830271 | A | * | 2/1996 |
| JP | H08221065 | | | 8/1996 |
| JP | H11231873 | | | 8/1999 |
| JP | 2005012728 | | | 1/2005 |
| JP | 2010181723 | | | 8/2010 |

OTHER PUBLICATIONS

"International Search Report (Form PCT/ISA/210) of PCT/JP2018/013908," dated Jun. 12, 2018, with English translation thereof, pp. 1-3.

* cited by examiner

| parameter name | parameter value |
|---|---|
| SW | OFF, ON |
| Type | Chorus、Phaser、Tremolo、Vibrato |
| Rate | 0～100 |
| Depth | 0～100 |
| Level | 0～100 |

patch table

| parameter name | | parameter value |
|---|---|---|
| chain | item1 | name of the first executed subroutine |
| | item2 | name of the second executed subroutine |
| | item3 | name of the third executed subroutine |
| | item4 | name of the fourth executed subroutine |
| | item5 | name of the fifth executed subroutine |
| | item6 | name of the sixth executed subroutine |
| | item7 | name of the seventh executed subroutine |
| channel | | A, B, A+B |
| FX1 | SW | OFF, ON |
| | Type | Chorus、Phaser、Tremolo、Vibrato |
| | Rate | 0~100 |
| | Depth | 0~100 |
| | Level | 0~100 |
| ... | | |
| FX4 | SW | OFF, ON |
| | Type | Chorus、Phaser、Tremolo、Vibrato |
| | Rate | 0~100 |
| | Depth | 0~100 |
| | Level | 0~100 |

FIG. 5

EFFECT IMPARTING DEVICE, CONTROL METHOD AND NON-TRANSITORY COMPUTER READABLE MEDIUM

CROSS-REFERENCE TO RELATED APPLICATION

This application is a 371 application of the international PCT application serial no. PCT/JP2018/013908, filed on Mar. 30, 2018. The entirety of the above-mentioned patent application is hereby incorporated by reference herein and made a part of this specification.

BACKGROUND

Technical Field

The present invention relates to a device for imparting sound effects, control method and non-transitory computer readable medium.

Related Art

In the field of music, an effect imparting device (effector) is used that processes a sound signal output from an electronic musical instrument or the like and adds an effect such as reverb, chorus, or the like. Particularly, in recent years, a digital signal processing device such as a digital signal processor (DSP) has been widely used. By performing the digital signal processing, parameters and a combination of plural effects at the time of applying effects can be easily switched. For example, sets of the parameters (referred to as patches) used for imparting the effects can be stored in advance and can be switched in real time during performance. Thereby, desired effects can be obtained at appropriate timings.

On the other hand, the conventional effector has a problem that the output acoustic signal becomes discontinuous when the effects to be imparted are switched. In the effector that uses the DSP, when the effects are changed, a corresponding program is loaded each time, and thus it is difficult to change types of the effects while continuously outputting a continuous sound signal. For example, a phenomenon occurs in which the output sound is broken each time the effects are switched.

To address this problem, for example, in an effect imparting device according to patent literature 1, a path for outputting an original sound by bypassing effect units is arranged. When an effect switching operation is performed, the sound output from the effect units is temporarily reduced to output the original sound, and crossfade control is performed to restore the effects after the effects are changed.

LITERATURE OF RELATED ART

Patent Literature

Patent literature 1: Japanese Patent Laid-Open No. 6-289871

SUMMARY

Problems to be Solved

According to the invention of patent literature 1, sound break at the time of switching effects can be suppressed. However, in the invention, whether the sound break occurs when the designation of a patch is switched cannot be properly determined in an embodiment in which the parameters are collectively applied to plural effect units by the patch.

The present invention is completed in view of the above problems, and an objective of the present invention is to provide an effect imparting device that can obtain a more natural sound.

Means to Solve Problems

The effect imparting device according to the present invention for solving the above problems includes:

a plurality of effect units which impart effects to a sound that has been input; a storage part which stores a plurality of patches having a collection of parameters applied to the plurality of effect units; an input part which receives designation of the patches; an application part which applies the parameters included in the patch that has been designated to the plurality of effect units; an output part which outputs the sound to which an effect has been imparted according to the parameters applied to the plurality of effect units; and a muting part which temporarily mutes the sound that is output and to which the effect has been imparted when there is an effect unit whose type of an effect is changed according to a change in the designation of the patches among the plurality of effect units.

The effect unit is a unit that imparts an effect to a sound that has been input according to a designated parameter. The effect unit may be a logical unit.

The effect imparting device according to the present invention has a configuration in which a plurality of patches having a collection of parameters to be applied to a plurality effect units are stored, and the parameters included in the designated patch can be applied to the plurality effect units.

In addition, the muting part determines whether there is an effect unit whose type of an effect is changed according to the designation of the patch among the plurality of effect units, and if there is, the muting part temporarily mutes the output sound to which the effect has been imparted. The muting may be performed for each effect unit or may be performed for the final output.

When the designation of the patches is changed, the parameters of the plural effect units are changed, but the types of the effects of all the effect units are not necessarily changed. For example, there is a case that the types of the effects are the same, and only other parameters (for example, delay time, feedback level, and the like) are changed. In this case, if known coefficient interpolation processing is applied, the output sound signal does not become discontinuous, and thus muting is not required. Therefore, in the effect imparting device according to the present invention, the muting processing is executed only when there is an effect unit whose type of an effect is changed according to the application of the patch among the plural effect units. With this configuration, the case where the sound signal is not discontinuous can be excluded, and thus a sense of incongruity given to the listener can be minimized.

In addition, the muting part may temporarily mute the sound to which the effect has been imparted when there is an effect unit whose type of an effect is changed according to a change in the designation of the patches, and the sound to which the effect has been imparted from the effect unit according to the parameters before the change in the designation of the patches is being output by the output part.

Even when the type of effect is changed, there is no reason to perform the muting processing when the sound to which the effect has been imparted is not output, for example, when the corresponding effect unit is invalid. Therefore, the muting processing may be performed under a further condition that the sound to which the effect has been imparted is finally being output from the corresponding effect unit.

In addition, the effect units may switch types of the effects by reading a program corresponding to the effects which have been changed.

The present invention can be suitably applied to, for example, an effect imparting device such as a DSP or the like that switches the type of the effect by loading a different program. The reason is that, in this embodiment, the sound to which the effect has been imparted is temporarily broken while the program is being loaded.

In addition, the patches may include information designating validation states of channels in which each effect unit is arranged, and the muting part may determine the muting further based on the information designating the validation states of the channels. In addition, the patches may include information designating validation states of each effect unit, and the muting part may determine the muting further based on the information designating the validation states of the effect unit.

A validation state of a channel (effect unit) is information indicating whether the channel (effect unit) is valid or invalid.

When validity/invalidity of the channel in which the effect unit is arranged can be designated, a case may occur in which the sound from the effect unit is not finally output depending on the state of the channel. Similarly, if the validity/invalidity of the effect unit can be designated, a case may occur in which the sound from the effect unit is not finally output depending on the state of the effect unit.

Thus, the presence/absence of the muting processing may be determined further based on the validation state of the channel in which the target effect unit is arranged and the validation state of the effect unit.

In addition, when there is an effect unit arranged in a channel whose validation states is changed before and after the change in the designation of the patches, the application part may apply the parameters during an invalidation period of the channel where the effect unit is arranged.

In addition, when there is an effect unit whose validation states is changed before and after the change in the designation of the patches, the application part may apply the parameters during an invalidation period of the effect unit.

If the target effect unit is in an invalid state, or if the channel in which the target effect unit is arranged is in an invalid state, the sound to which the effect has been imparted is not output, and thus even if the type of the effect is changed, no sound break or noise is generated. Thus, useless muting processing can be avoided by applying the parameter in a period when the state of the effect unit or the channel is invalid.

Moreover, the present invention can be specified as an effect imparting device including at least some of the above parts. In addition, the present invention can also be specified as an effect imparting method performed by the effect imparting device. In addition, the present invention can also be specified as a program for executing the effect imparting method. The above processing and parts can be freely combined and implemented as long as no technical contradiction occurs.

BRIEF DESCRIPTION OF THE DRAWINGS

FIG. 5 is an example of a data structure (patch table) corresponding to patches.

DESCRIPTION OF THE EMBODIMENTS

First Embodiment

A first embodiment is described below with reference to the drawings.

An effect imparting device according to the embodiment is a device that imparts sound effects by digital signal processing to an input sound and outputs the sound to which the effects have been imparted.

Figure 1:
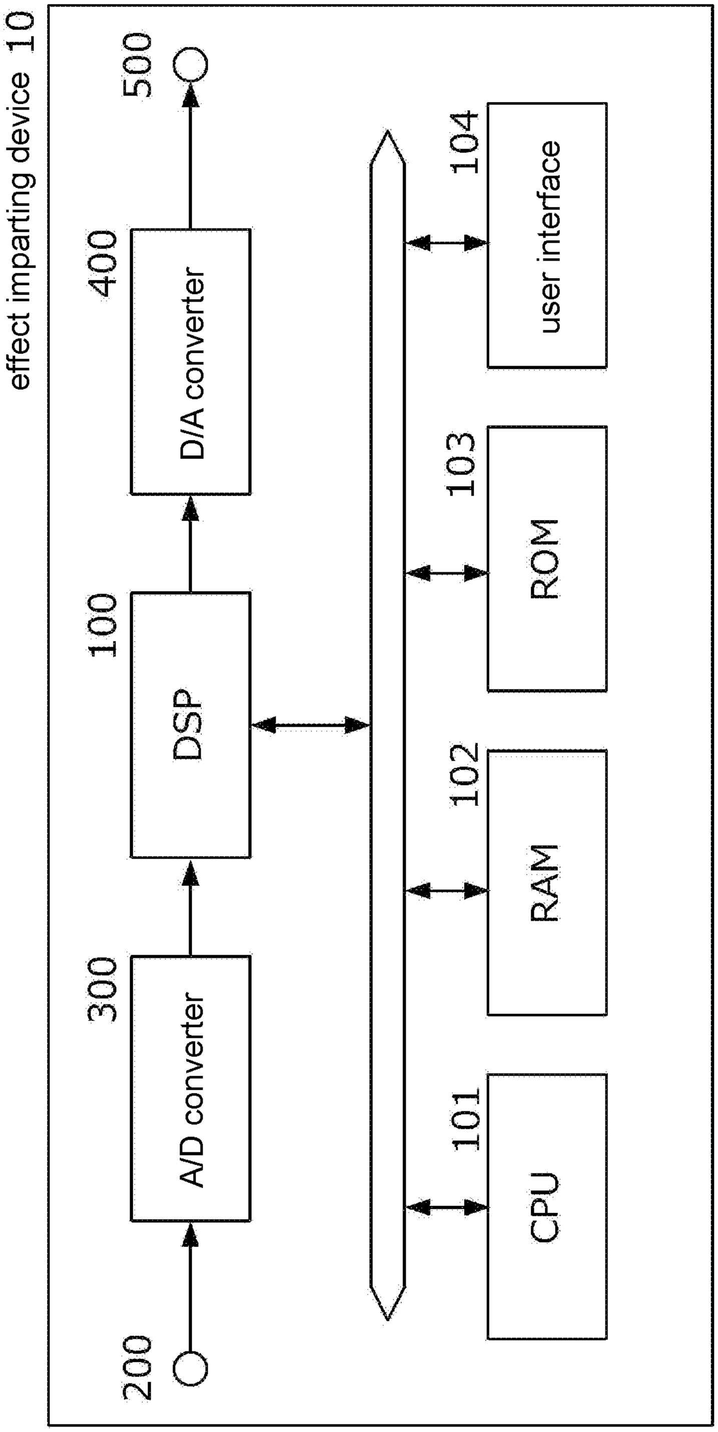
FIG. 1 is a configuration diagram of an effect imparting device 10 according to a first embodiment.

The configuration of the effect imparting device 10 according to the embodiment is described with reference to FIG. 1.

The effect imparting device 10 is configured to include a sound input terminal 200, an A/D converter 300, a DSP 100, a D/A converter 400, and a sound output terminal 500. The sound input terminal 200 is a terminal for inputting a sound signal. The input sound signal is converted into a digital signal by the A/D converter 300 and processed by the DSP 100. The processed sound is converted into an analog signal by the D/A converter 400 and output from the sound output terminal 500.

The DSP 100 is a microprocessor specialized for the digital signal processing. In the embodiment, the DSP 100 performs processing specialized for processing the sound signal under the control of a CPU 101 described later.

In addition, the effect imparting device 10 according to the embodiment is configured to include the central processing unit (CPU) 101, a RAM 102, a ROM 103, and a user interface 104.

A program stored in the ROM 103 is loaded into the RAM 102 and executed by the CPU 101, and thereby the processing described below is performed. Moreover, all or a part of the illustrated functions may be executed using a circuit designed exclusively. In addition, the program may be stored or executed by a combination of a main storage device and an auxiliary storage device other than the devices illustrated.

The user interface 104 is an input interface for operating the device and an output interface for presenting information to the user.

Figure 2:
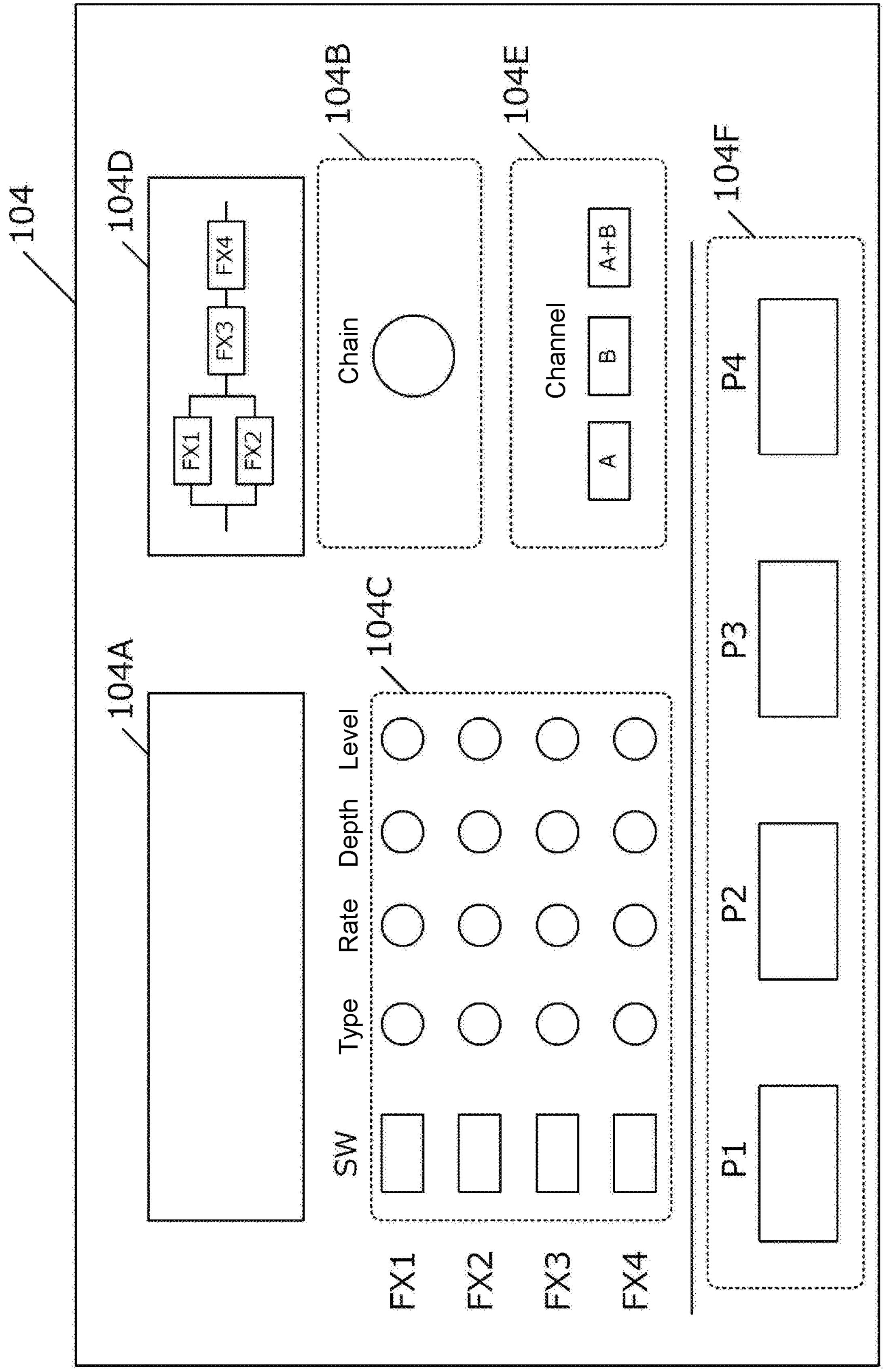
FIG. 2 is an example of a user interface 104.

FIG. 2 is an example of the user interface 104. In the embodiment, the user interface 104 includes an operation panel that is an input device and a display device (display) that is an output device. Reference signs 104A and 104D indicate displays. In addition, shapes shown by rectangles in the diagram are push buttons, and shapes shown by circles are knobs for designating a value by rotating.

The effect imparting device according to the embodiment can perform the following operations via the user interface 104. Moreover, settings performed by the operations are respectively stored as parameters, and the stored parameters are collectively applied when a patch described later is designated.

(1) Setting of Parameters for Each Effect Unit

The DSP 100 according to the embodiment includes a logical unit (hereinafter referred to as effect unit, and referred to as FX if necessary) that imparts the effects to the input sound. The effect unit is implemented by the DSP 100 executing a predetermined program. The CPU 101 assigns the program and sets a coefficient referred to by the program.

Figures 3, 4:
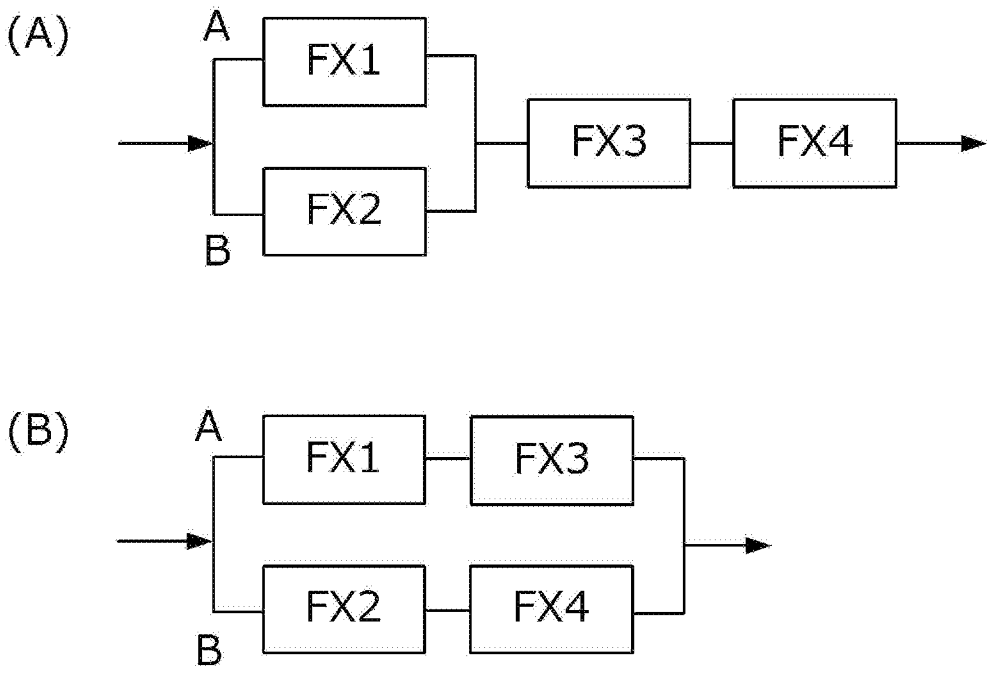
FIG. 3 is a list of parameters applicable to effect units.
FIG. 4 is a diagram illustrating connection forms of the effect units.

In the embodiment, four effect units FX1 to FX4 can be used, and parameters applied to each effect unit (the types of the effects to be imparted, depth, and the like) can be set by the interface indicated by a reference sign 104C. FIG. 3 is a list of the parameters applicable to each of the four effect units.

SW is a parameter that specifies whether or not to impart an effect. When the SW parameter is OFF, no effect is imparted and the original sound is output. In addition, when the SW parameter is ON, the sound to which the effect has been imparted is output. In this way, the SW parameter designates the validation state of the effect unit. The SW parameter can be specified by the push buttons.

Type is a parameter that designates the type of the effect. In the embodiment, four types of Chorus, Phaser, Tremolo, and Vibrato can be designated. In addition, Rate is a parameter that designates a speed at which an effect sound fluctuates. In addition, Depth is a parameter that designates a depth of the fluctuation of the effect sound. In addition, Level is a parameter that designates an output volume of the effect sound. In the embodiment, each parameter is represented by a numerical value from 0 to 100 and can be designated by a knob.

The parameters set for each effect unit can be confirmed on the display indicated by the reference sign 104A.

(2) Chain Setting

The DSP 100 according to the embodiment can set a connection form of plural effect units.

FIG. 4 is a diagram illustrating connection forms of the effect units. The left side in the diagram is the input side, and the right side is the output side. For example, in the example of (A) of FIG. 4, effects are respectively imparted to the input sound signal by the FX1 and the FX2, and after mixing, the effects are further applied by the FX3 and the FX4 and output. In addition, in the example of (B) of FIG. 4, a sound to which effects are imparted by the FX1 and the FX3 and a sound to which effects are imparted by the FX2 and the FX4 are mixed and output. In this way, a desired effect can be obtained by combining the effect units to which arbitrary parameters are applied.

The connection form of the effect units is also called a chain and can be changed by the interface indicated by the reference sign 104B. For example, a desired connection form can be selected from plural connection forms by a knob. In the example of FIG. 2, the chain currently set is graphically displayed on the display indicated by the reference sign 104D.

(3) Channel Setting

When plural sound paths are configured depending on the connection form of the effect units, which path is valid can be set. In the embodiment, three types of channel A, channel B, and channel A+B can be designated by an interface (push button) indicated by a reference sign 104E. For example, in the case of the example in (A) of FIG. 4, if channel A is designated, only the FX1 becomes valid and the path in which the FX2 is arranged is disconnected. Similarly, in the case of the example in (B) of FIG. 4, if channel A is designated, only the FX1 and the FX3 are valid, and the paths in which the FX2 and the FX4 are arranged are disconnected.

(4) Designation of Patches

The patch is a set of data including a set of parameters applied to the plural effect units, the chain setting, and the channel setting. FIG. 5 shows a data structure (patch table) corresponding to patches.

The effect imparting device according to the embodiment has a function of storing a collection of parameters which are set via the user interface as the patches, and collectively applying these parameters when the operation for designating the patch is performed. Specifically, the patch is designated by pressing push buttons indicated by a reference sign 104F. When a patch is designated (that is, any one of the buttons P1 to P4 is pressed), the parameters included in the corresponding patch are collectively applied. That is, the parameters of each effect unit, the channel setting, and the chain setting are collectively changed. Moreover, content setting of the patches (generation of the patch table) may be associated with the push buttons in advance.

The aforementioned each part is communicatively connected by a bus.

Next, a specific method by which the DSP 100 imparts the effects to the input sound is described. In the DSP 100 according to the embodiment, four types of subroutines of FX, divider, splitter, and mixer are defined, and the DSP 100 executes these subroutines in a predetermined order based on the set chain to thereby impart the effects to the input sound.

Specifically, based on the set chain, the CPU 101 updates an address table stored in the DSP 100, and the DSP 100 refers to the address table to sequentially execute the subroutines, thereby imparting the effects to the input sound.

Figure 6:
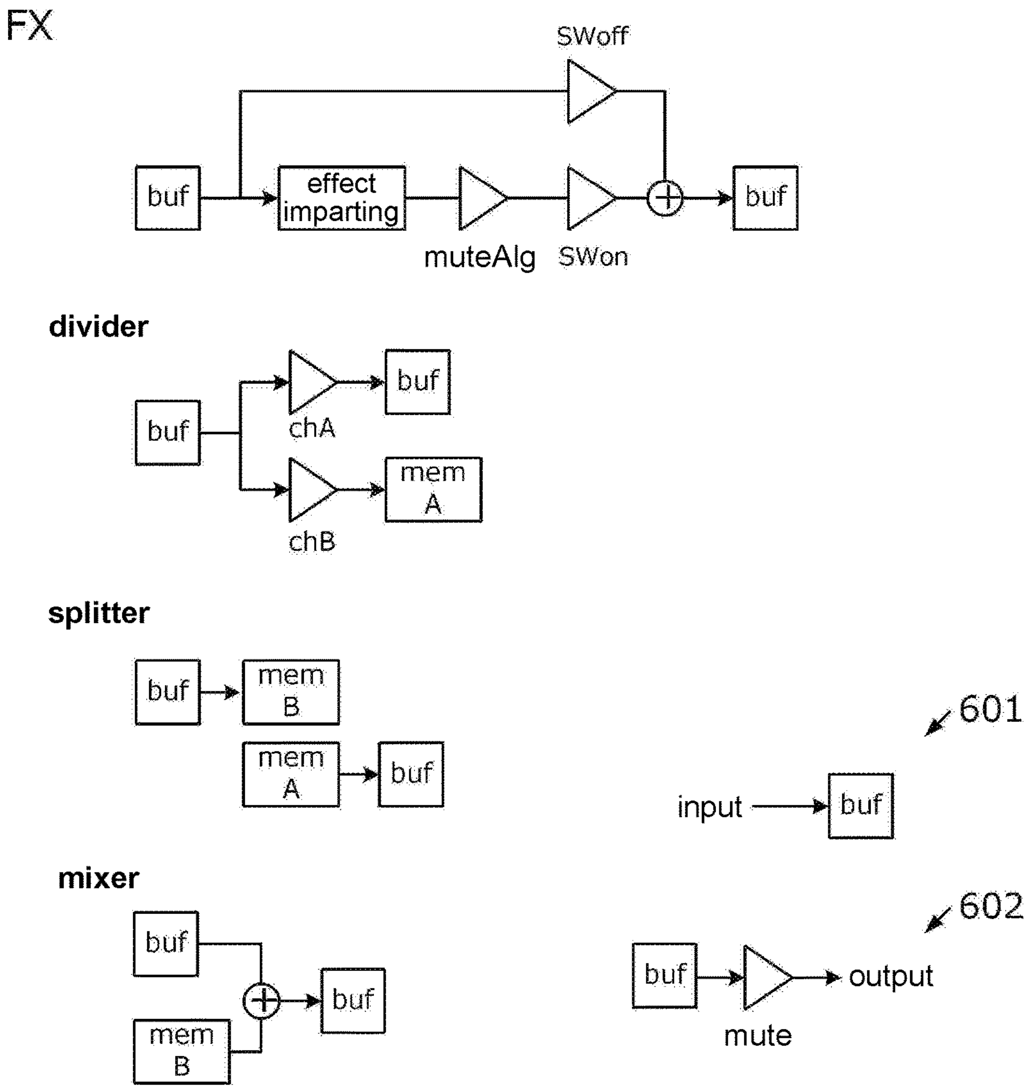
FIG. 6 is a pseudo circuit diagram corresponding to a subroutine executed by a DSP.

FIG. 6 is a diagram showing processing performed by each subroutine by a pseudo circuit.

Moreover, here, the sound signal input to the DSP 100 is first stored in a buffer (buf) (reference sign 601), and finally the sound signal stored in the buffer is output (reference sign 602). In addition, triangles in the diagram are coefficients. Here, the sound signal passes when the coefficient is set to 1. Moreover, the coefficient may be gradually changed toward a set value with a known interpolation processing.

(1) FX

FX is a subroutine corresponding to an effect unit that imparts a designated type of effect to a sound signal, and is prepared individually for the four effect units of FX1 to FX4. FX imparts the effect to the sound signal according to a value corresponding to a parameter designated for each effect unit. In addition, a rewritable program memory is assigned to the FX, and the effect is imparted by loading a program corresponding to the type of the effect into the program memory.

In addition, as shown in the diagram, the FX is provided with a path for bypassing the sound signal and is valid when the SW parameter is OFF. That is, when SW is ON, the SWon coefficient becomes 1 and the SWoff coefficient becomes 0. In addition, when the SW parameter is OFF, the SWon coefficient becomes 0 and the SWoff coefficient becomes 1. The muteAlg coefficient is described later.

(2) Divider

The divider is a subroutine that duplicates the input sound signal. Specifically, the contents of the buffer are temporarily copied to a memory A (memA). The divider is executed when the sound path is branched into channel A and channel B.

Moreover, a chA coefficient and a chB coefficient are set based on the channel setting. Specifically, the chA coefficient is 1 when the channel A is valid, and the chB coefficient is 1 when the chB coefficient is valid. If the channel A+B is valid, both the chA coefficient and the chB coefficient are 1.

(3) Splitter

The splitter is a subroutine that saves the contents of the buffer in a memory B and reads the contents of the memory A into the buffer. The splitter is processing executed at the final stage of the path of the branched channel A.

(4) Mixer

The mixer is a subroutine that adds (mixes) the contents of the buffer and the contents of the memory B. The mixer is processing executed when sound paths of the channel A and the channel B are integrated.

Figure 7:
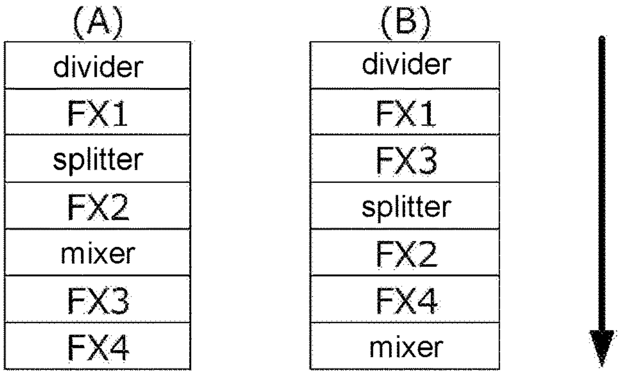
FIG. 7 is a diagram showing an execution order of the subroutine.

An arbitrary chain can be expressed by changing the execution order of these subroutines. For example, a chain shown in (A) of FIG. 4 can be implemented by executing the subroutines in an order shown in (A) of FIG. 7. In addition, a chain shown in (B) of FIG. 4 can be implemented by executing the subroutines in an order shown in (B) of FIG. 7.

The DSP 100 according to the embodiment holds the execution order of these subroutines in the patch table as a data structure representing the chains. By applying the patch defined in this way to the DSP 100, a pre-set chain can be instantly called.

Meanwhile, when the user selects a patch to be newly applied, the parameters of each effect unit are changed along with the chain setting. As described above, the DSP 100 operates according to the program, and therefore loading of the program internally occurs when the Type parameter of the effect unit is changed. That is, in a state when a certain patch is applied, the sound is broken or noise is generated at the moment when the other patch is applied.

As a measure against this problem, there is a method of temporarily muting the output in the effect unit when applying the Type parameter. For example, the output can be temporarily muted by setting the muteAlg coefficient shown in FIG. 6 to 0 before and after applying the Type parameter.

However, if the muting is unconditionally performed at the timing when the patch is applied, unnecessary muting may occur, which may be incongruous to the listener.

The measure is specifically described.

For example, on the chain shown in (A) of FIG. 4, the channel B is valid and the effect type is changed only for the FX1 by applying the patch. In this case, there is no need to mute the FX2 to the FX4. However, in the conventional technique, this situation cannot be determined, and muting is performed for all effect units as a result. Besides, when the muting is sequentially executed, as a result, the sound output is repeatedly intermittent, resulting in an increase in the sense of incongruity.

To deal with this problem, the effect imparting device according to the embodiment determines that an effect unit requiring a change in the types of the effects is generated when the designation of the patch is changed, and the sound to which the effects are imparted by the effect unit is finally output, and the final output is muted only when the conditions are satisfied.

The specific method is described.

Figure 8:
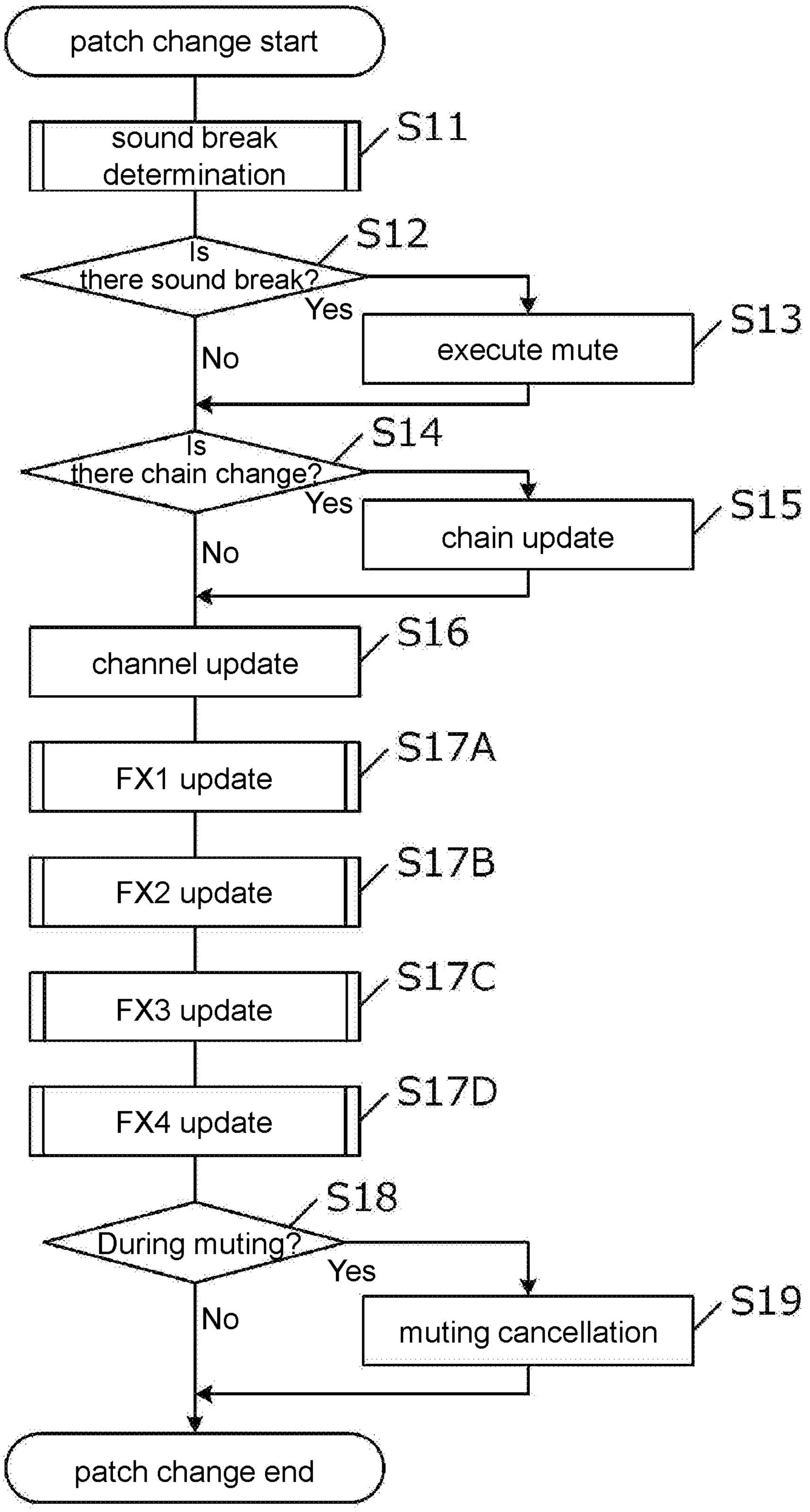
FIG. 8 is a flowchart of processing executed by a CPU 101 according to the first embodiment.

FIG. 8 is a flowchart of the processing executed by the CPU 101 according to the embodiment. The processing shown in FIG. 8 is started at the timing (timing for patch change) when a new patch is designated and applied.

First, in step S11, whether a sound break occurs with the application of the patch is determined. The sound break means that the finally output sound signal becomes discontinuous and handling such as muting is necessary.

Figure 9:
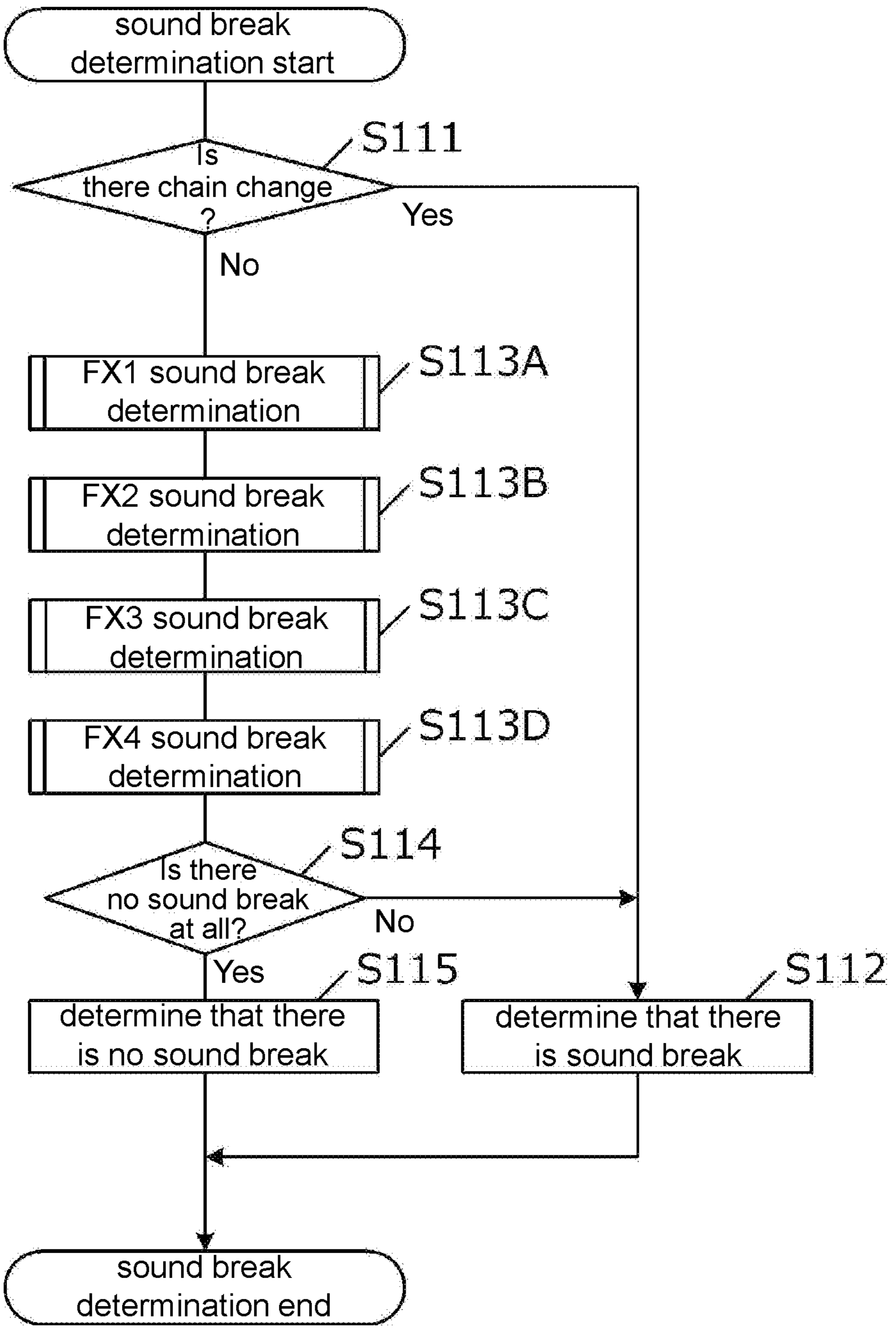
FIG. 9 is a flowchart specifically showing processing in step S11.

Specific processing performed in step S11 is described with reference to FIG. 9.

First, in step S111, whether the chain is changed before and after the patch is applied is determined. Here, if the chain is changed, it is determined that a sound break occurs (step S112). The reason is that the sound signal becomes discontinuous because the connection relationship of the effect units changes.

Next, for each effect unit, whether a sound break due to the setting of the effect units occurs before and after the application of the patch is determined (referred to as FX sound break determination). Moreover, the processing in steps S113A to S113D is different only in the target effect unit and the processing is similar, and thus only step S113A is described.

Figure 10:
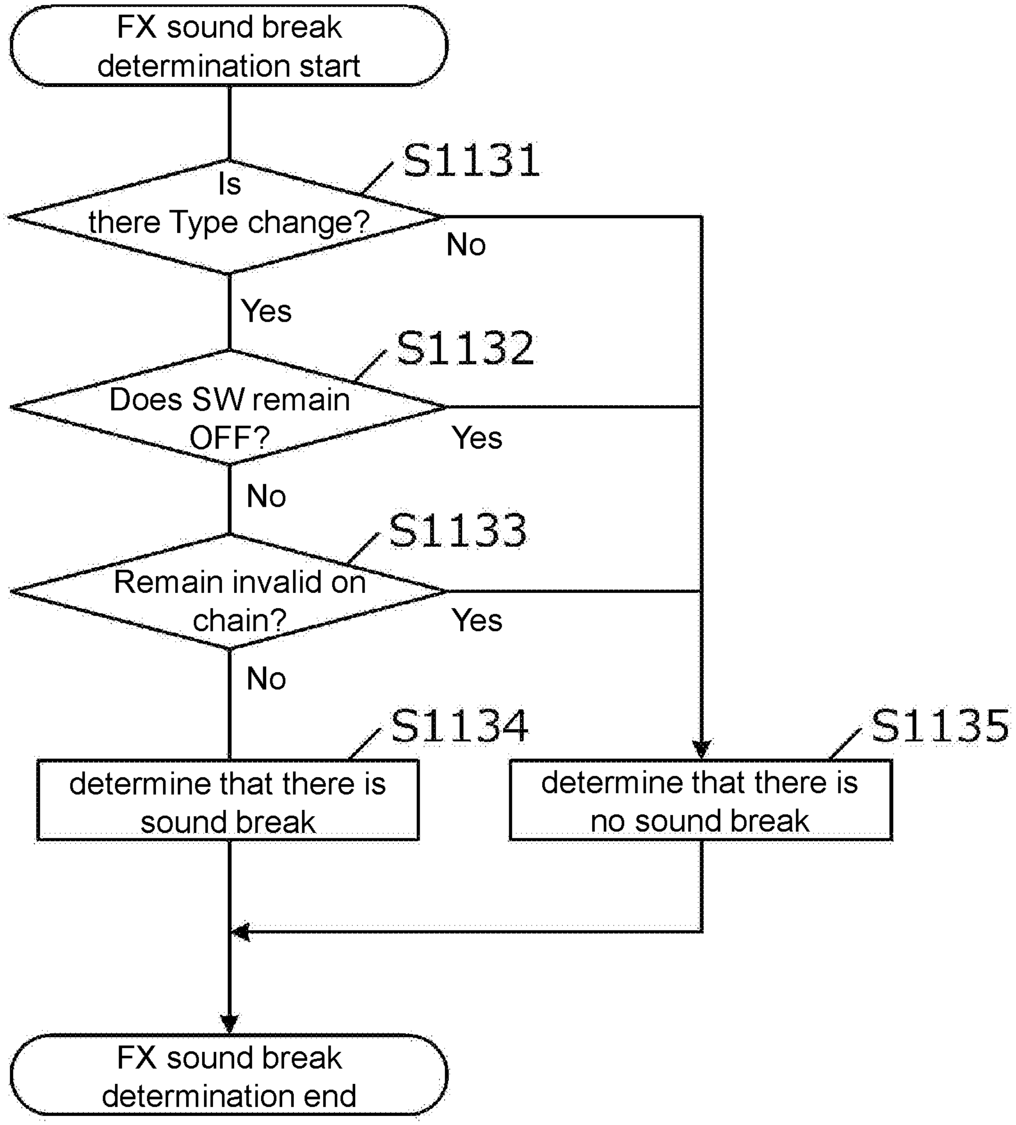
FIG. 10 is a flowchart specifically showing processing in step S113.

The specific processing performed in step S113A is described with reference to FIG. 10.

First, in step S1131, whether the Type parameter of the target effect unit is changed is determined. Here, if there is no change, the processing proceeds to step S1135, and it is determined that the sound break due to the target effect unit does not occur. The reason is that the reading of the program does not occur.

When the Type parameter is changed before and after the application of the patch, whether the SW parameter remains OFF is determined in step S1132. Here, if the SW parameter does not change and remains OFF before and after the application of the patch, sound break does not occur, and thus the processing proceeds to step S1135. If the change in the SW parameter is any of OFF to ON, ON to OFF, and ON to ON, the sound break may occur, and thus the processing proceeds to step S1133.

In step S1133, whether the target effect unit remains invalid on the chain is determined. Here, if the target effect unit does not change and remains invalid on the chain before and after the application of the patch, sound break does not occur, and thus the processing proceeds to step S1135. Being invalid on the chain is, for example, a case in which the target effect unit is arranged on an invalid channel.

If the target effect unit is valid on the chain (including changing from valid to invalid, from valid to valid, and from invalid to valid), the processing proceeds to step S1134, and it is determined that the sound break due to the target effect unit occurs.

The description is continued with reference to FIG. 9 again.

The processing described in step S113A is also executed for the FX2 to the FX4.

Then, in step S114, whether it is determined that sound break does not occur for all effect units is determined. If it is determined as a result that sound break does not occur for all the effect units, the processing proceeds to step S115, and it is determined that sound break finally does not occur. If sound break occurs even in one effect unit, the processing proceeds to step S116, and it is determined that the sound break finally occurs. The processing of step S11 is ended as described above.

The description is continued with reference to FIG. 8 again.

If it is determined in step S11 that sound break occurs (step S12—Yes), muting processing is performed in step S13. In this step, muting is performed by setting 0 to the mute coefficient shown in FIG. 6. If it is determined in step S11 that no sound break occurs (step S12—No), the processing proceeds to step S14.

In step S14, whether there is a change on the chain before and after the application of the patch is determined, and if there is a change, the chain is updated (step S15). Specifically, the address table referred to when the DSP 100 executes the subroutines is rewritten based on the execution order of the subroutines described in items 1 to 7 of the patch table (FIG. 5). Moreover, the subroutines are specified by name in this example, but the subroutines may also be specified by address.

In step S16, the channel is updated. Specifically, as described below, when the channel A is designated, the path corresponding to the channel B is invalidated by setting 1 to the chA coefficient and 0 to the chB coefficient in FIG. 6. In addition, when the channel B is specified, the path corresponding to the channel A is invalidated by setting 0 to the chA coefficient and 1 to the chB coefficient. When channels A and B are specified, both coefficients are set to 1. Thereby, the effect units on both paths are valid.

Channel A: chA=1, chB=0

Channel B: chA=0, chB=1

Channel A+B: chA=1, chB=1

In steps S17A to D, parameters are applied to each effect unit. Moreover, the processing in steps S17A to S17D are different only in the target effect unit and the processing is similar, and thus only step S17A is described.

Figure 11:
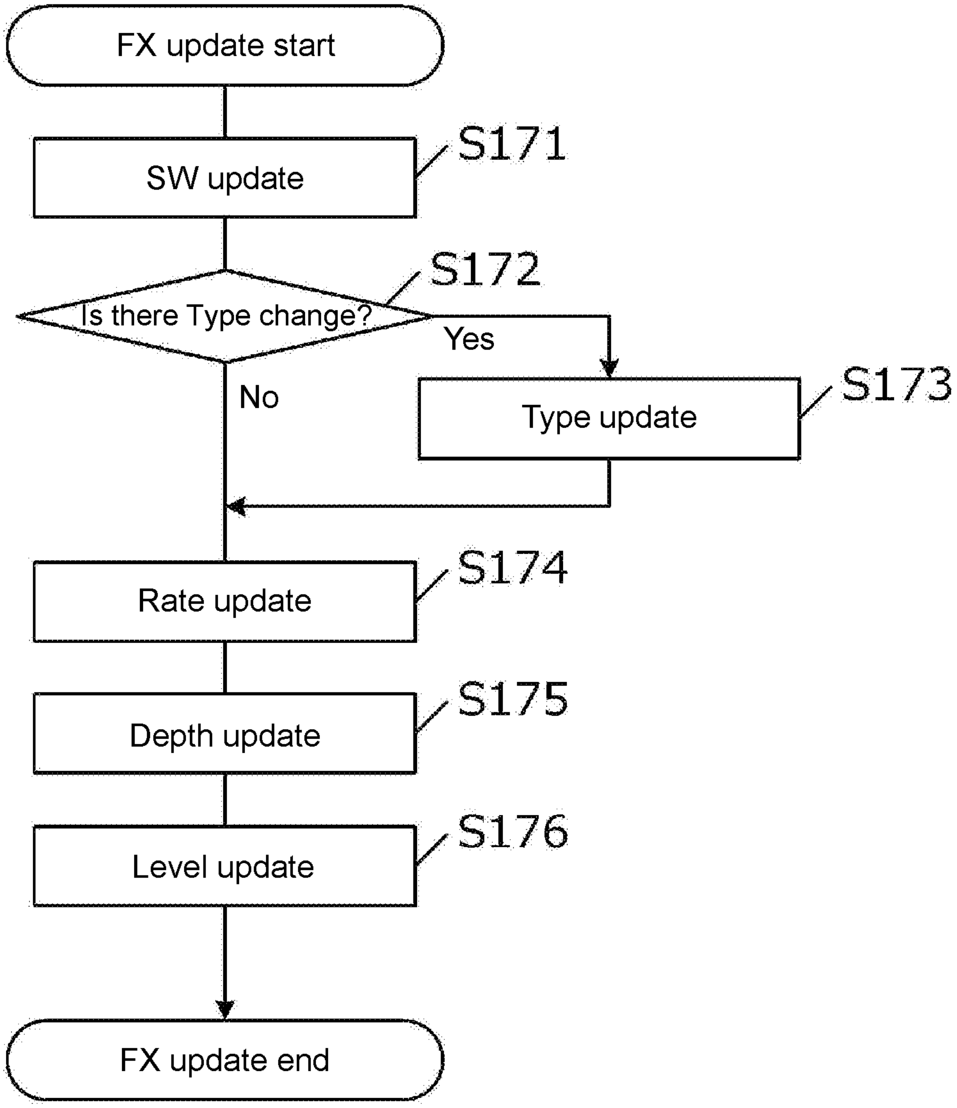
FIG. 11 is a flowchart specifically showing processing in step S17.

Specific processing performed in step S17A is described with reference to FIG. 11.

First, in step S171, the SW parameter is applied. Specifically, the following values are set for each coefficient used by the FX.

When the SW parameter is ON: SWon=1, SWoff=0

When the SW parameter is OFF: SWon=0, SWoff=1

Next, in step S172, whether the Type parameter is changed before and after the patch is applied is determined, and if the Type parameter is changed, the Type parameter is applied in step S173. Specifically, the CPU 101 reads the program corresponding to the changed Type parameter from the ROM 103 and loads the program into the program memory corresponding to the target effect unit.

Moreover, at this time, the muteAlg coefficient of the target effect unit may be updated after being temporarily set to 0, and then the coefficient may be returned to 1.

Next, in steps S174 to S176, the Rate parameter, the Depth parameter, and the Level parameter are applied. Specifically, a value referred to by the program is updated according to the value of each parameter.

The description is continued with reference to FIG. 8 again.

In step S18, whether muting has occurred in step S13 is determined, and if muting is in occurrence, the muting is cancelled (step S19). Specifically, the mute coefficient is set to 1.

As described above, the effect imparting device according to the first embodiment determines that there is an effect unit requiring update in the types of the effects before and after applying the patch, and performs the muting processing under a condition that a valid output is obtained from the effect unit. According to this form, a case in which sound break does not occur can be excluded, and thus, the occurrence of a useless mute process at the time of applying the patch can be suppresses. In addition, a sense of incongruity caused by the useless muting processing can be suppressed.

Moreover, in the embodiment, the final sound output is muted by rewriting the mute coefficient in steps S13 and S19. However, when there is only one effect unit that causes sound break among the plural effect units, muting may be performed using a coefficient other than the mute coefficient. For example, in steps S13 and S19, the muteAlg coefficient of the corresponding effect unit may be operated to mute only the corresponding effect unit.

Second Embodiment

In the first embodiment, in steps S1132 and S1133, in a case that a state is reached in which the sound to which the effect has been imparted is not output from the target effect unit and the state does not change even after the patch is applied, it is determined that sound break does not occur. However, even in other cases, it may not be necessary to mute the target effect unit.

This is described with reference to FIG. 12.

FIG. 12(A) is an example of a case that a state, in which the sound to which the effect has been imparted is not output from the target effect unit, is changed to a state in which the sound is output. Whether the sound to which the effect has been imparted is output can be determined by, for example, the SW parameter, the chain setting, or the channel setting. In this case, when the type of the effect of the target effect unit is changed, in the first embodiment, it is determined that the sound break occurs.

However, in this case, there is a period (1) during which the sound to which the effect has been imparted is not output, and thus if the Type parameter is applied during this period, sound break does not occur.

Figure 12:
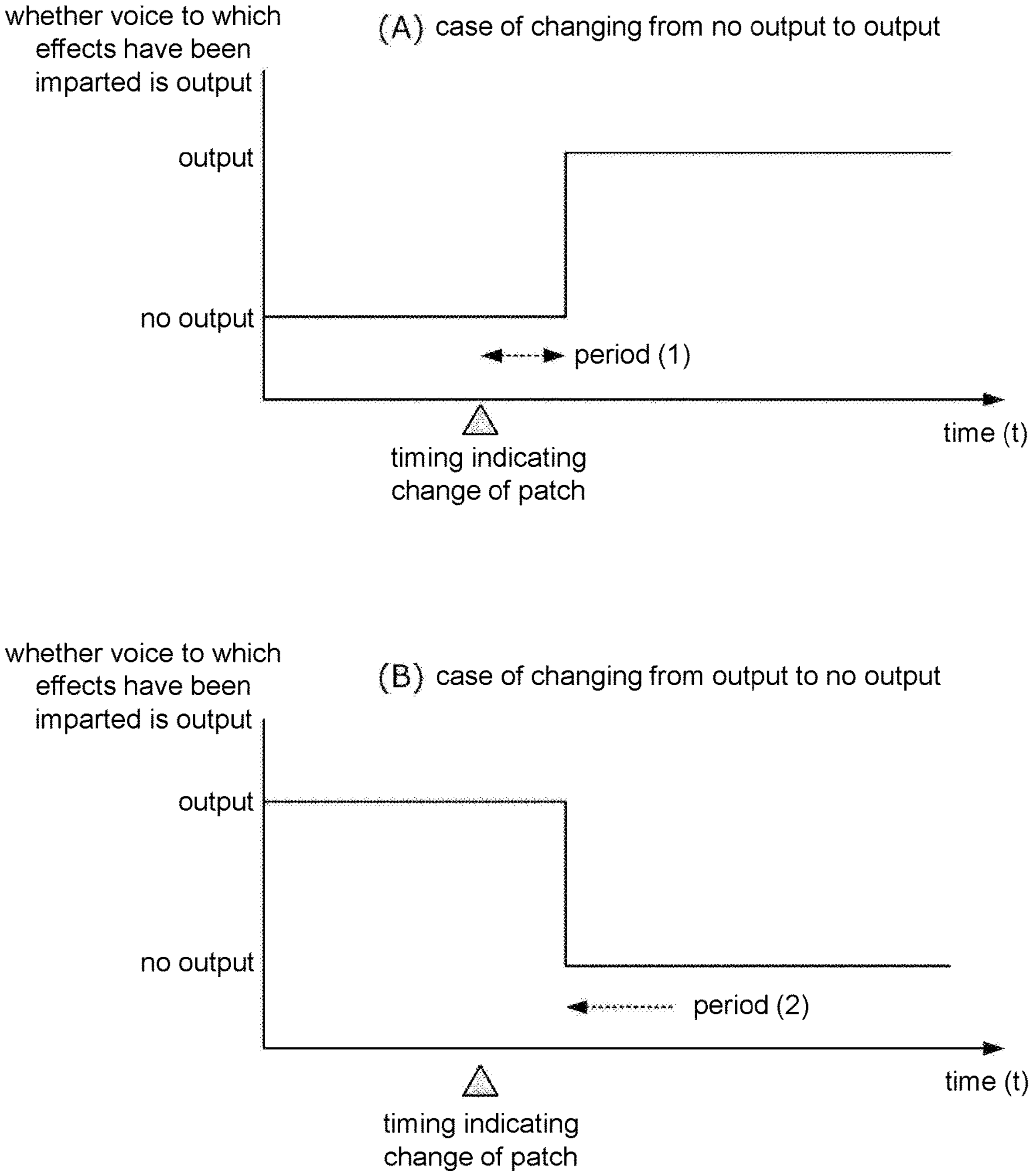
FIG. 12 is a diagram illustrating timings of applying the parameters.

(B) of FIG. 12 is an example of a case that a state, in which the sound to which the effects have been applied is output from the target effect unit, is changed to a state in which the sound is not output. In this case, when the type of the effect of the target effect unit is changed, in the first embodiment, it is determined that the sound break occurs. However, in this case as well, there is a period (2) in which the sound to which the effect has been imparted is not output, and thus if the Type parameter is applied during this period, sound break does not occur.

In this way, the second embodiment is an embodiment in which a case where the sound break can be avoided is determined and the application timing of the Type parameter is adjusted instead of performing the muting processing.

Figure 13:
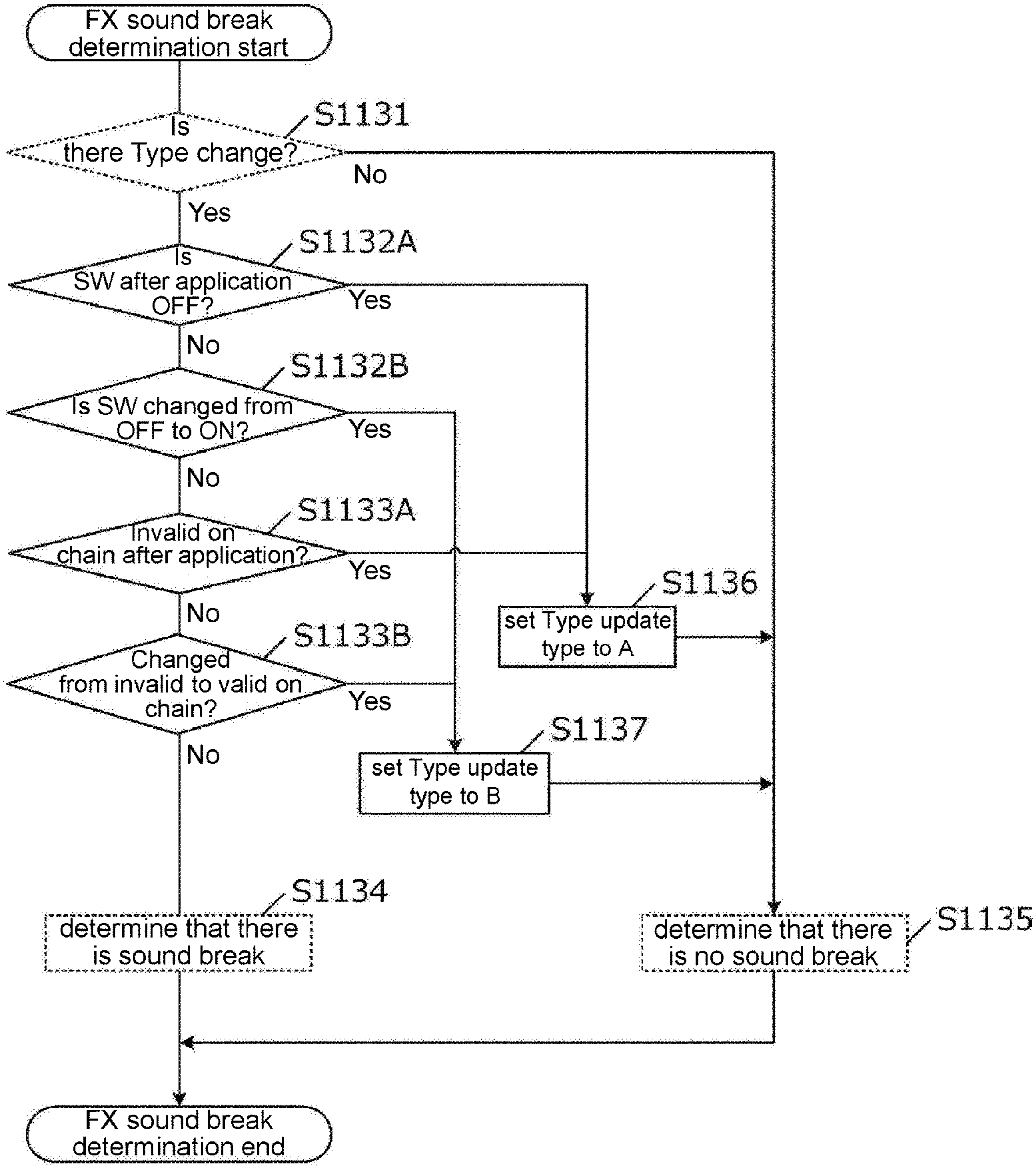
FIG. 13 is a specific flowchart of step S113 in a second embodiment.

FIG. 13 is a specific flowchart of step S113 in the second embodiment. The same processing as those of the first embodiment is illustrated by dotted lines, and the description is omitted. Moreover, a Type update type in the following description is a type that defines the timing when the Type parameter is applied in step S17. Specifically, when the Type update type is B, the Type parameter is applied in a period before the output of the sound to which the effect has been imparted is started. In addition, when the Type update type is A, the Type parameter is applied during a period after the output of the sound to which the effect has been imparted is stopped.

In the second embodiment, first, in step S1132A, whether the SW parameter after the application of the patch is OFF is determined. Here, an affirmative determination is made in the case of (B) of FIG. 12 or in the case where the sound to which the effect has been imparted is not output from the beginning, that is, the case where the parameter is OFF both before and after the application of the patch. In this case, the Type update type is set to A.

Next, in step S1132B, whether the SW parameter is changed from OFF to ON is determined. The case of an affirmative determination here corresponds to the case of FIG. 12(A), and thus the Type update type is set to B.

Next, in step S1133A, whether the target effect unit is invalid on the chain after the application of the patch is determined. Here, an affirmative determination is made in the case of (B) of FIG. 12 or in the case where the sound to which the effect has been imparted is not output from the beginning, that is, the case where the target effect unit is invalid both before and after the application of the patch. In this case, the Type update type is set to A.

Next, in step S1133B, whether the target effect unit is changed from invalid to valid on the chain is determined. The case of an affirmative determination here corresponds to the case of FIG. 12(A), and thus the Type update type is set to B.

Other steps are the same as those in the first embodiment.

Furthermore, in the second embodiment, in step S173, the Type parameter of the corresponding effect unit is applied, that is, the program is read at the timing according to the set Type update type. Thereby, sound break can be avoided without performing the muting processing. Moreover, when the Type update type is not set, the control processing of the timing may not be performed.

Modification Example

The above embodiments are merely examples, and the present invention can be implemented with appropriate modifications without departing from the scope of the present invention.

For example, in the description of the embodiments, the muting control is performed by controlling the mute coefficient in FIG. 6, but the muting control may also be performed for each effect unit.

In addition, although the sound may be completely muted during muting, a path that bypasses the original sound may be arranged and the path may be activated. At this time, for example, crossfade control as described in the known technique may be performed. In addition, in the description of the embodiments, the effect imparting device using DSP is exemplified, but the present invention may also be applied to an effect imparting device other than the DSP.

What is claimed is:

1. An effect imparting device, comprising:

a plurality of effect units which impart effects to a sound that has been input;

a storage part which stores a plurality of patches having a collection of parameters applied to the plurality of effect units and information designating validation states of channels in which each of the plurality of effect units is arranged, wherein the channels are plural sound paths configured by connecting the effect units, and the validation states are information indicating whether each of the plural sound paths is valid or invalid;

an input part which receives designation of patches;

an application part which applies the parameters included in the patches that has been designated to the plurality of effect units;

an output part which outputs the sound to which an effect has been imparted according to the parameters applied to the plurality of effect units; and a muting part which mutes the sound that is to be output when there is an effect unit in a channel which had been designated in the validation state and whose type of an effect is changed according to a the designation of the patches among the plurality of effect units before the parameters are applied to the plurality of effect units, and the muting is canceled after the parameters are applied to the plurality of the effect units.

2. The effect imparting device according to claim 1, wherein the muting part temporarily mutes the sound to which the effect has been imparted when there is the effect unit in which the type of an effect is changed according to the change in the designation of the patches, and the sound to which the effect has been imparted from the effect unit according to the parameters before the change in the designation of the patches is being output by the output part.

3. The effect imparting device according to claim 2, wherein the effect unit switches types of the effects by reading a program corresponding to the effects which have been changed.

4. The effect imparting device according to claim 1, wherein when there is an effect unit arranged in a channel whose validation states is changed before and after the change in the designation of the patches, the application part applies the parameters during an invalidation period of the channel where the effect unit is arranged.

5. The effect imparting device according to claim 1, wherein the patches comprise information designating validation states of each of the plurality of effect units, and the muting part determines the muting further based on the information designating the validation states of the effect unit, wherein the validation states of each of the effect units are information indicating whether or not the effect units to impart effects to the sound.

6. The effect imparting device according to claim 5, wherein when there is an effect unit whose validation states is changed before and after the change in the designation of the patches, the application part applies the parameters during an invalidation period of the effect unit.

7. A control method which controls a plurality of effect units that impart effects to a sound that has been input, comprising:

an acquisition step of acquiring a patch having a collection of parameters applied to the plurality effect units and information designating validation states of channels in which each of the plurality of effect units is arranged, wherein the channels are plural sound paths configured by connecting the effect units, and the validation states are information indicating whether each of the plural sound paths is valid or invalid; and an application step of applying the parameters included in a designated patch to the plurality of effect units; and a muting step of muting the sound that is to be output when there is an effect unit in a channel which had been designated in the validation state and whose type of an effect is changed according to a the designation of the patches among the plurality of effect units before the parameters are applied to the plurality of effect units, and the muting is canceled after the parameters are applied to the plurality of the effect units.

8. A non-transitory computer readable medium storing a program for causing a computer to execute the control method according to claim 7.

9. The effect imparting device according to claim 2, wherein the patches comprise information designating validation states of each of the plurality of effect units, and the muting part determines the muting further based on the information designating the validation states of the effect unit, wherein the validation states of each of the effect units are information indicating whether or not the effect units impart effects to the sound.

10. The effect imparting device according to claim 3, wherein the patches comprise information designating validation states of each of the plurality of effect units, and the muting part determines the muting further based on the information designating the validation states of the effect unit, wherein the validation states of each of the effect units are information indicating whether or not the effect units impart effects to the sound.

11. The control method according to claim 7, wherein the muting step comprising temporarily muting the sound to which the effect has been imparted when there is the effect unit in which the type of an effect is changed according to the change in the designation of the patches, and the sound to which the effect has been imparted from the effect unit according to the parameters before the change in the designation of the patches is being output by the application step.

12. The control method according to claim 11, wherein the effect unit switches types of the effects by reading a program corresponding to the effects which have been changed.

13. The control method according to claim 7, wherein when there is an effect unit arranged in a channel whose validation states is changed before and after the change in the designation of the patches, the application step applies the parameters during an invalidation period of the channel where the effect unit is arranged.

14. The control method according to claim 7, wherein the patches comprise information designating validation states of each of the plurality of effect units, and the muting step determines the muting further based on the information designating the validation states of the effect unit, wherein the validation states of each of the effect units are information indicating whether or not the effect units impart effects to the sound.

15. The control method according to claim 14, wherein when there is an effect unit whose validation states is changed before and after the change in the designation of the patches, the application step applies the parameters during an invalidation period of the effect unit.

* * * * *